(12) United States Patent
Sah et al.

(10) Patent No.: US 8,715,124 B2
(45) Date of Patent: May 6, 2014

(54) METHOD AND APPARATUS FOR EXECUTING A SHIFT IN A POWERTRAIN SYSTEM

(75) Inventors: Jy-Jen F. Sah, West Bloomfield, MI (US); Lawrence A. Kaminsky, White Lake, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 13/160,937

(22) Filed: Jun. 15, 2011

(65) Prior Publication Data

US 2012/0322600 A1    Dec. 20, 2012

(51) Int. Cl.
*B60W 10/08*    (2006.01)

(52) U.S. Cl.
USPC ............................................. 475/5; 903/946

(58) Field of Classification Search
USPC .................. 475/5, 149; 477/5, 6; 903/946
See application file for complete search history.

(56) References Cited

U.S. PATENT DOCUMENTS

| | | | |
|---|---|---|---|
| 2010/0227722 A1* | 9/2010 | Conlon | 475/5 |
| 2011/0009236 A1* | 1/2011 | Yang et al. | 477/5 |
| 2012/0209461 A1* | 8/2012 | Kaminsky et al. | 701/22 |
| 2012/0265383 A1* | 10/2012 | Kaminsky et al. | 701/22 |
| 2012/0322610 A1* | 12/2012 | Sah et al. | 477/5 |

OTHER PUBLICATIONS

U.S. Appl. No. 13/029,381, not pub'd., Michael Arnett.
U.S. Appl. No. 13/160,937, not pub'd., Jy-Jen F. Sah.
U.S. Appl. No. 13/160,908, not pub'd., Sean W. McGrogan.
U.S. Appl. No. 13/161,584, not pub'd., Sean W. McGrogan.
U.S. Appl. No. 13/161,602, not pub'd, Jy-Jen F. Sah.
U.S. Appl. No. 13/152,380, not pub'd, Michael Arnett.
U.S. Appl. No. 13/162,720, not pub'd, Ryan D. Martini.
U.S. Appl. No. 13/163,668, not pub'd, Anthony H. Heap.
U.S. Appl. No. 13/163,115, not pub'd, Jy-Jen F. Sah.
U.S. Appl. No. 13/162,767, not pub'd, Sean McGrogan.

* cited by examiner

*Primary Examiner* — Sherry Estremsky
*Assistant Examiner* — Lillian Nguyen

(57) ABSTRACT

A method to shift a powertrain system from a first operating mode to a second operating mode wherein a common clutch is activated to effect operation in both the first and second operating modes includes, in sequence, deactivating the common clutch, activating an oncoming clutch associated with the second operating mode and deactivating an off-going clutch associated with the first operating mode, and activating the common clutch.

5 Claims, 3 Drawing Sheets

METHOD AND APPARATUS FOR EXECUTING A SHIFT IN A POWERTRAIN SYSTEM

TECHNICAL FIELD

This disclosure is related to vehicle powertrain systems and shift execution.

BACKGROUND

The statements in this section merely provide background information related to the present disclosure. Accordingly, such statements are not intended to constitute an admission of prior art Powertrain systems including hybrid powertrain systems, electric-only powertrain systems, and extended-range electric powertrain systems are configured to operate in a plurality of operating modes. Such powertrain systems use torque generators, clutches and transmissions to transfer torque to a driveline. Executing a shift from a first operating mode to a second operating mode may include executing a direct shift process that includes deactivating an off-going clutch and activating an oncoming clutch. Propulsion torque during shift execution may be maintained by slipping either an oncoming clutch or an off-going clutch while synchronizing speeds of clutch elements of the oncoming clutch before fully applying the oncoming clutch, with an applied clutch that is common for the first and second states being continuously applied during the shift execution. Synchronizing the speeds of the clutch elements includes controlling operation of one of the torque generators to achieve a synchronization speed. Other powertrain control permutations to maintain output torque during a shift execution are known.

Known issues associated with executing a direct shift process include driveline power loss and energy loss during clutch slippage. The power loss during clutch slippage may be discernible by a vehicle operator.

SUMMARY

A method to shift a powertrain system from a first operating mode to a second operating mode wherein a common clutch is activated to effect operation in both the first and second operating modes includes, in sequence, deactivating the common clutch, activating an oncoming clutch associated with the second operating mode and deactivating an off-going clutch associated with the first operating mode, and activating the common clutch.

BRIEF DESCRIPTION OF THE DRAWINGS

One or more embodiments will now be described, by way of example, with reference to the accompanying drawings, in which:

FIGS. 3-1 through 3-5 depict progression of a first shift sequence for a powertrain system using the control scheme of FIG. 2 in accordance with the disclosure; and FIGS. 4-1 through 4-5 depict progression of a second shift sequence for a powertrain system using the control scheme of FIG. 2 in accordance with the disclosure.

DETAILED DESCRIPTION

Figure 1:
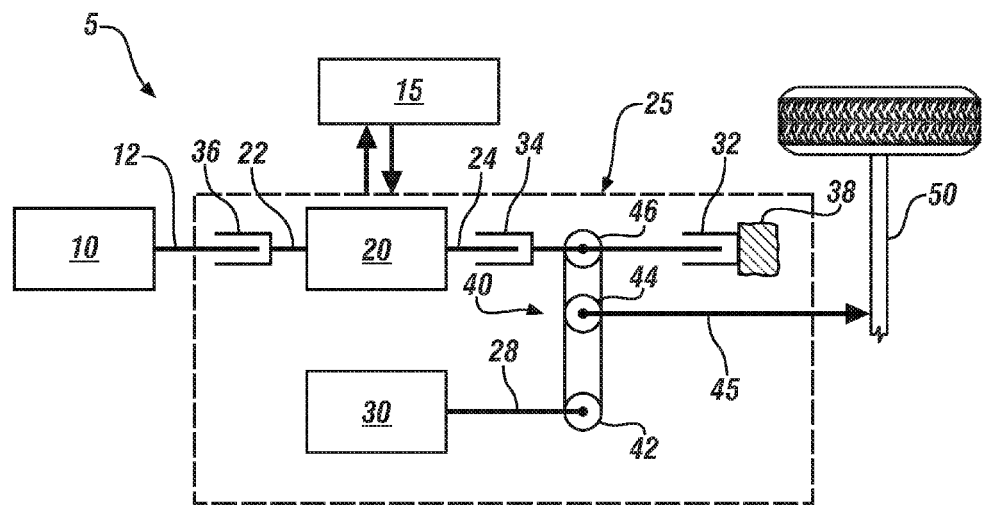
FIG. 1 is a schematic diagram of an exemplary powertrain system including an internal combustion engine, first and second torque machines, and planetary gear set coupled to a driveline in accordance with the disclosure.

Referring now to the drawings, wherein the showings are for the purpose of illustrating certain exemplary embodiments only and not for the purpose of limiting the same, FIG. 1 is a schematic diagram of an exemplary powertrain system 5 including an internal combustion engine 10 and a transmission 25 including first and second torque machines 20 and 30, respectively, and a planetary gear set 40. The powertrain system 5 is coupled to a driveline 50 to transfer tractive torque thereto. The internal combustion engine 10 and the first and second torque machines 20, 30 are any suitable machines. In one embodiment, the first and second torque machines 20, 30 are multiphase electric motor/generator devices that electrically connect to a high-voltage power source via an electric power inverter. A control module 15 is configured to control operation of the powertrain system 5. The powertrain system 5 as shown is configured for use in an extended range electric vehicle (EREV) configuration, with the concepts described herein applicable to other powertrain and vehicle configurations. The powertrain system 5 is meant to be illustrative and not limiting.

The internal combustion engine 10 is configured to execute an autostop event and an autostart event during ongoing powertrain operation. As is appreciated, an autostop event occurs when engine operation is discontinued and the internal combustion engine 10 is in an OFF state and is not rotating during ongoing powertrain operation to conserve fuel. As is appreciated, an autostart event is executed subsequent to executing an autostop event to start or restart engine operation during ongoing powertrain operation. As is appreciated, the engine 10 may be started to transfer tractive torque to the driveline 50 and/or to provide power to the first torque machine 20 to generate energy that may be used to generate tractive torque by one or both the first and second torque machines 20, 30.

The powertrain system 5 includes first, second, and third torque-transfer devices C1 32, C2 34, and C3 36, respectively, which may be any suitable clutch elements, e.g., friction clutch packs, brakes, band clutches, and one-way clutches. All torque transfer devices are simply referred to herein as clutches. The first clutch C1 32 is a brake element that is configured to couple a ring gear element 46 of the planetary gear set 40 to a transmission case ground 38 when applied. The second clutch C2 34 is configured to couple the ring gear element 46 of the planetary gear set 40 to an output member 24 of the first torque machine 20 when applied. The third clutch C3 36 is configured to couple an input member 22 of the first torque machine 20 to an output member 12 of the engine 10 when applied. An input member 28 of the second torque machine 30 couples to a sun gear element 42 of the planetary gear set 40. An output member 45 coupled to a planet gear assembly 44 of the planetary gear set 40 couples to the driveline 50.

Table 1 describes clutch activations associated with specific operating modes of the powertrain system of FIG. 1. The term 'x' indicates that the specific clutch is activated when in the corresponding operating mode. Each of the operating modes is indicated by the activated clutch(es), if any.

TABLE 1

| Operating Mode | C1 | C2 | C3 |
|---|---|---|---|
| Neutral 1 | | | |
| Neutral 2 | | | x |
| Mode 1 (1 motor EV) | x | | |
| Mode 2 (2 motor EV) | | x | |
| Mode 3 (Series) | x | | x |
| Mode 4 (Load Share) | | x | x |
| Transition Mode | x | x | |

Specific ones of the powertrain elements, e.g., the internal combustion engine 10 and the first and second torque machines 20, 30, are controlled to generate tractive torque, if any, in the various operating modes in response to load demands including an operator torque request. "EV" indicates electric vehicle operation, i.e., tractive torque being generated by one or both of the first and second torque machines 20, 30. The engine 10 is preferably in the OFF state during the electric vehicle operation, although such operation is not required.

The first neutral mode (Neutral 1) indicates that no tractive torque is being generated, and it is accomplished with the first, second, and third torque-transfer clutches C1 32, C2 34, and C3 36, respectively, being deactivated.

The second neutral mode (Neutral 2) indicates that no tractive torque is being generated, and it is accomplished with the first and second torque-transfer clutches C1 32 and C2 34 being deactivated. The third torque-transfer clutch C3 36 is activated, permitting torque transfer between the engine 10 and the first torque machine 20. This may include electric power generation, i.e., power flow from the engine 10 to the first torque machine 20, or engine starting, i.e., power flow from the first torque machine 20 to the engine 10.

Mode 1 (1 motor EV) is an electric vehicle mode wherein tractive torque is generated by torque machine 30. In this embodiment, the second torque machine 30 generates tractive torque and the engine 10 and the first torque machine 20 are decoupled from the driveline 50 by deactivation of the second and third torque-transfer clutches C2 34 and C3 36. The first torque-transfer clutch C1 32 is activated to ground the ring gear 46 to transfer torque and speed of the second torque machine 30 to the driveline 50.

Mode 2 (2 motor EV) is an electric vehicle mode wherein tractive torque is generated by both the first and second torque machines 20, 30. The engine 10 is decoupled from the driveline 50 by deactivation of the third torque-transfer clutch C3 36. The second torque-transfer clutch C2 34 is activated to combine and transfer torque and speed from the first and second torque machines 20, 30 through the planetary gear set 40 to the driveline 50.

Mode 3 (Series) is a series-hybrid mode wherein tractive torque is generated by the second torque machine 30 and the engine 10 is coupled to the first torque machine 20 by activation of the third torque-transfer clutch C3 36 to generate electric power that is preferably used by the second torque machine 30. The engine 10 is decoupled from the driveline 50 by deactivation of the second torque-transfer clutch C2 34. The first torque-transfer clutch C1 32 is activated to ground the ring gear 46 to transfer torque and speed of the second torque machine 30 to the driveline 50.

Mode 4 (Load Share) is an engine-on load share mode wherein tractive torque is generated by both the first second torque machines 20, 30, and the engine 10 by activation of the second torque-transfer clutch C2 34 and the third torque-transfer clutch C3 36. The first torque-transfer clutch C1 32 is deactivated. The second torque-transfer clutch C2 34 and the third torque-transfer clutch C3 36 are activated to combine and transfer torque and speed from the engine 10 and the first and second torque machines 20, 30 through the planetary gear set 40 to the driveline 50.

The Transition Mode is an operating mode that is preferably utilized exclusively during mid-shift between Mode 3 (series-hybrid mode) and Mode 4 (load share mode), and between Mode 1 (1 Motor EV mode) and Mode 2 (2 Motor EV mode). The Transition Mode includes the first torque-transfer clutch C1 32 activated, the second torque-transfer clutch C2 34 activated and the third torque-transfer clutch C3 36 deactivated.

Figure 2:
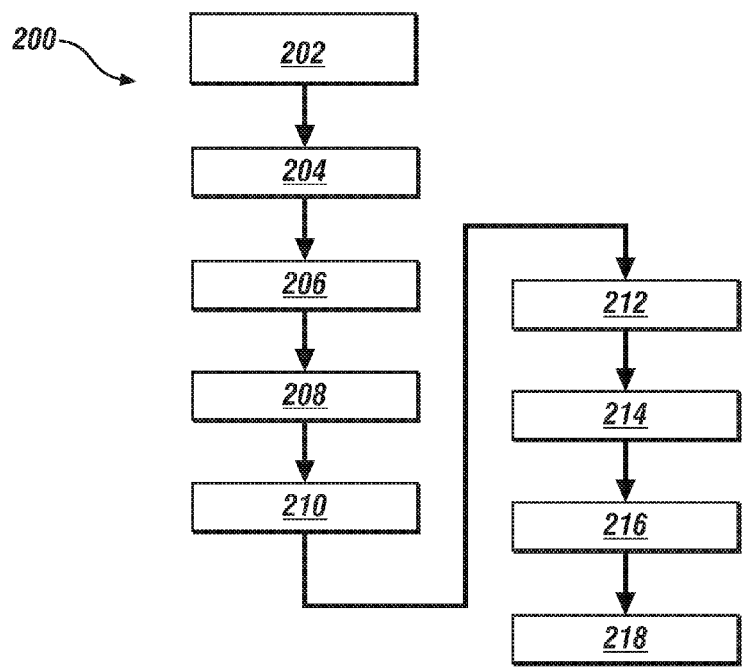
FIG. 2 is a control scheme in flowchart form, including sequentially executed steps to effect a shift from a first operating mode to a second operating mode in accordance with the disclosure.

FIG. 2 illustrates a control scheme 200 that includes steps that are sequentially executed to effect a shift from a first operating mode to a second operating mode. The control scheme 200 is described with reference to the illustrated powertrain system 5 of FIG. 1 to effect a shift between a first of the operating modes described in Table 1 to a second of the operating modes described in Table 1 during ongoing operation. It is preferred to control torque output to the driveline 50 so that a shift is imperceptible to a vehicle operator. It is appreciated that a synchronous shift is preferred to minimize clutch slippage affecting power losses. The control scheme 200 is particularly suited to effecting a shift between operating modes wherein the oncoming operating mode and the off-going operating mode have an activated clutch in common. By way of example, the powertrain system 5 illustrated with reference to FIG. 1 includes Mode 3 (Series) with clutches C1 32 and C3 36 activated and Mode 4 (Load Share) with clutches C2 34 and C3 36 activated. Clutch C3 36 is a commonly activated clutch, enabling the engine 10 to provide torque for either electric power generation (Mode 3) or torque and electric power generation (Mode 4).

The control scheme 200 is implemented as one or a plurality of algorithms that are executed in the control module 15. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event. Table 2 is provided as a key to FIG. 2 wherein the numerically labeled blocks and the corresponding functions are set forth as follows.

TABLE 2

| BLOCK | FIG. 2 BLOCK CONTENTS |
|---|---|
| 202 | Command Shift |
| 204 | Offload common clutch |
| 206 | Deactivate common clutch |
| 208 | Operate in one of Mode 1 or Mode 2 to synchronize speeds of elements of oncoming clutch |
| 210 | Activate oncoming clutch |
| 212 | Offload off-going clutch |
| 214 | Deactivate off-going clutch |
| 216 | Operate in one of Mode 2 or Mode 1 to synchronize speeds of elements of common clutch |
| 218 | Activate common clutch |

During ongoing operation, a shift is commanded (202). The commanded shift may be a shift between Mode 3 (Series) and Mode 4 (Load Share), either from Mode 3 to Mode 4 or from Mode 4 to Mode 3. The commanded shift may be a shift between Mode 1 (1 Motor EV mode) and Mode 2 (2 Motor EV mode), either from Mode 1 to Mode 2 or from Mode 2 to Mode 1. It is appreciated that shifts between other operating modes may instead be commanded, but are outside the scope of the control scheme 200.

The commanded shift described with reference to the control scheme 200 of FIG. 2 is a shift between Mode 3 (Series) and Mode 4 (Load Share). The commanded shift includes a sequence of events that includes deactivating the common clutch, e.g., C3 36, during an interim period as described herein. As such, the control system offloads torque from the common clutch by coordinating the magnitude of torque produced by the engine 10 with the magnitude of torque produced by the first torque machine 20 to neutralize torque across clutch C3 36 (204). In one example, this includes increasing power output from the first torque machine 20 and/or decreasing power output from the engine 10 to neutralize torque across clutch C3 36.

When the torque across common clutch C3 36 is neutralized, clutch C3 36 is deactivated (206). The powertrain system 5 then operates in one of the powertrain operating modes, e.g., Mode 1 or Mode 2 in accordance with the still activated clutch C1 32 or C2 34, respectively, to synchronize speeds of elements of the oncoming clutch (208).

When shifting to Mode 4 (Load Share), clutch C1 32 is still activated during this period in the shift process and the powertrain operating mode is presently Mode 1 (1 motor EV). The speed of the first torque machine 20 is controlled to synchronize the oncoming clutch C2 34 with the speed of the ring gear 46 of the planetary gear set 40. When shifting to Mode 3 (Series), clutch C2 34 is still activated during this period in the shift process and the powertrain operating mode is presently Mode 2 (2 motor EV). The speeds of the first and second torque machines 20 and 30 are controlled to synchronize the speed of the ring gear 46 of the planetary gear set 40 with the transmission case ground 38, i.e., the speeds of the first and second torque machines 20 and 30 are suitably controlled to stop rotation of the ring gear 46 and thus synchronize the speed of clutch C1 32 with the transmission case ground 38.

When the speeds of elements of the oncoming clutch are synchronized, the oncoming clutch is activated (210), and the powertrain system 5 operates in the Transition Mode with clutches C1 32 and C2 34 activated. By synchronizing the speeds of the elements of the oncoming clutch prior to activation, the oncoming clutch may be activated without slipping, i.e., is synchronously activated. The powertrain system 5 then operates in the Transition Mode to offload torque from the off-going clutch (212).

When shifting to Mode 4 (Load Share), clutch C1 32 is the off-going clutch and the torques of the first and second torque machines 20 and 30 are controlled to offload torque thereacross. When shifting to Mode 3 (Series), clutch C2 34 is the off-going clutch, and the speeds of the first and second torque machines 20 and 30 are controlled to offload torque across clutch C2 34.

When torque across the off-going clutch is offloaded, the off-going clutch is deactivated (214). The powertrain system 5 operates in one of the powertrain operating modes Mode 1 or Mode 2 in accordance with the still activated clutch C1 32 or C2 34, respectively, to control the first and/or second torque machines 20 and 30 and control operation of the engine 10 to synchronize the speeds of the elements of the common clutch, i.e., clutch C3 36 (216).

When shifting to Mode 4 (Load Share), clutch C2 34 is the still activated clutch, and the powertrain operating mode is presently Mode 2 (2 motor EV). The speeds of the engine 10 and the first and second torque machines 20 and 30 are controlled to synchronize the speeds of the elements of the oncoming clutch C3 36 without affecting the output torque to the output member 45 coupled to the driveline 50.

When shifting to Mode 3 (Series), clutch C1 32 is the still activated clutch, and the powertrain operating mode is presently Mode 1 (1 motor EV). The speeds of the engine 10 and the first torque machine 20 are controlled to synchronize speeds of the elements of the oncoming clutch C3 36. The output torque to the output member 45 coupled to the driveline 50 is maintained by the second torque machine 30.

When the speeds of the elements of the common clutch, i.e., clutch C3 36 are synchronized, clutch C3 36 is activated (218). The shift is complete, and the powertrain system 5 operates in the second operating mode.

FIGS. 3-1 through 3-5 depict progression of an exemplary first shift sequence from Mode 3 (Series) to Mode 4 (Load Share) for the powertrain system 5 using the sequentially executed control scheme 200 depicted with reference to FIG. 2. FIGS. 3-1 through 3-5 each shows the powertrain system 5 of FIG. 1 with selected ones of the first, second and third clutches C1 32, C2 34, and C3 36 activated or deactivated, with activation indicated by broken line ovals.

Figures 1, 3:
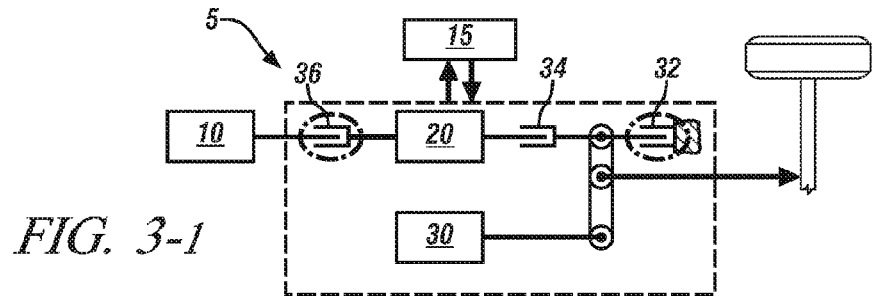
Figures 2, 3:
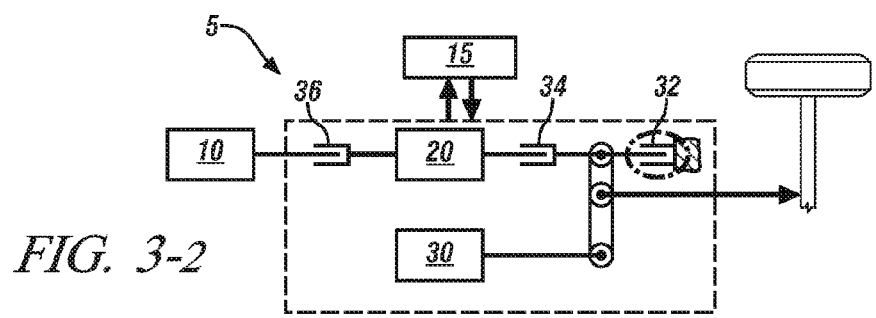
Figure 3:
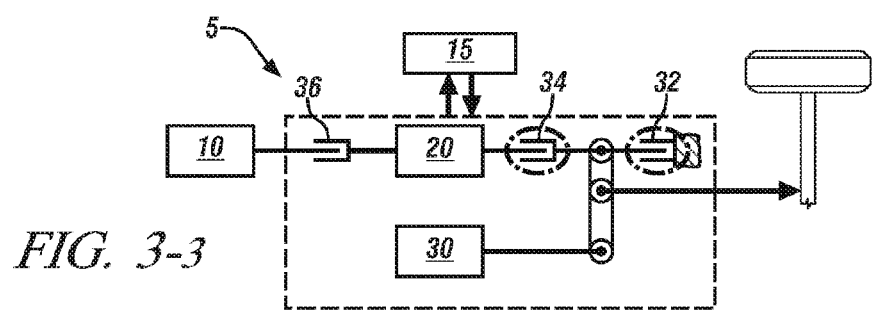
Figures 3, 4:
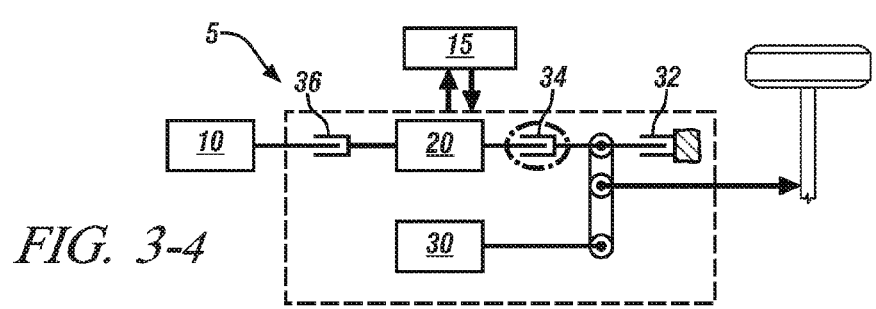
Figures 3, 4, 5:
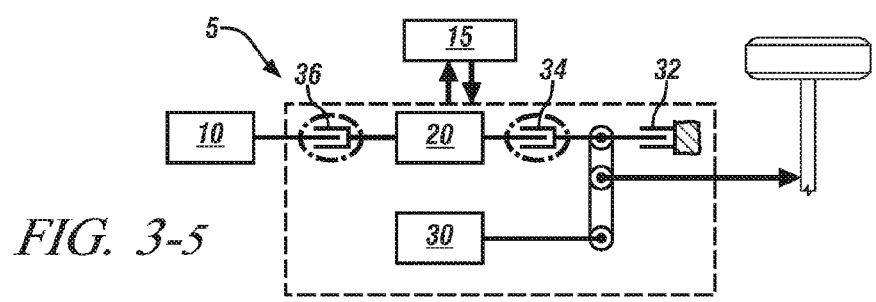
Figures 1, 4:
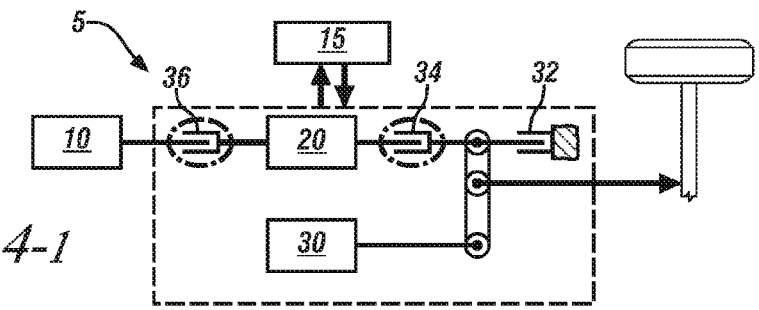
Figures 2, 4:
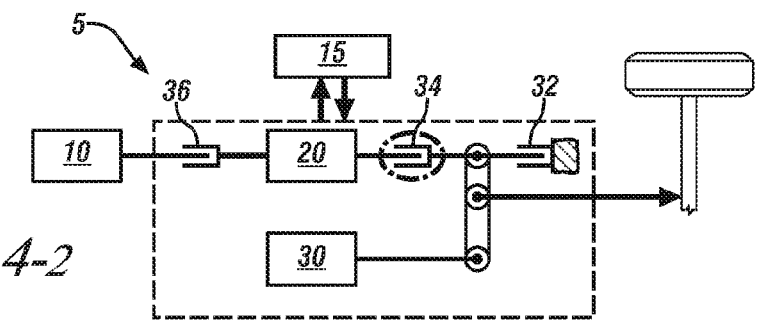
Figures 3, 4:
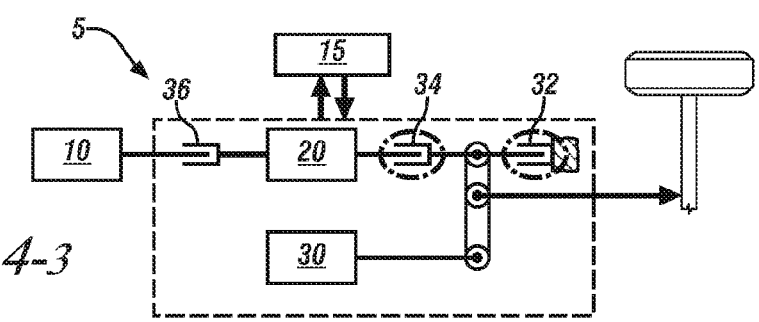
Figure 4:
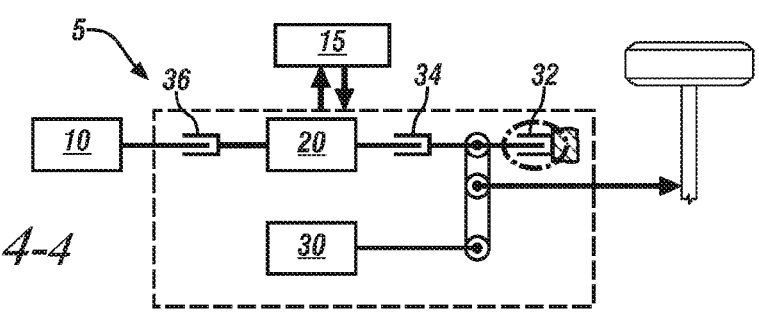
Figures 4, 5:
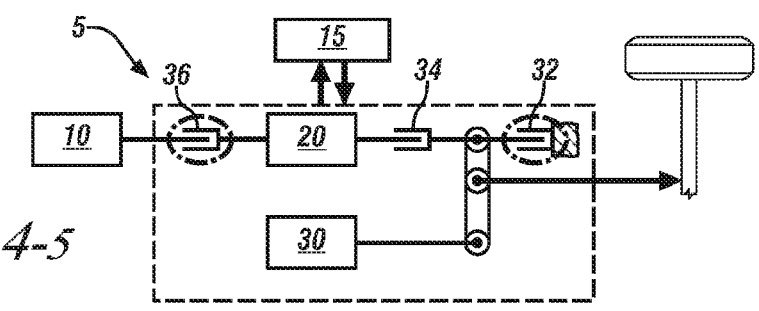

FIG. 3-1 shows initial operation in Mode 3 (Series) with clutches C1 32 and C3 36 activated. FIG. 3-2 shows operation in Mode 1 (1 motor EV) with clutch C1 32 activated after the common clutch C3 36 is deactivated. FIG. 3-3 shows operation in the Transition Mode with clutches C1 32 and C2 34 activated after clutch C2 34 has been activated. FIG. 3-4 shows operation in Mode 2 (2 motor EV) with clutch C2 34 activated after clutch C1 32 is deactivated. FIG. 3-5 shows operation in Mode 4 (Load Share) with clutches C2 34 and common clutch C3 36 activated, after common clutch C3 36 is activated to end the shift sequence.

FIGS. 4-1 through 4-5 depict progression of a second exemplary shift sequence from Mode 4 (Load Share) to Mode 3 (Series) for the powertrain system 5 using the sequentially executed control scheme 200 depicted with reference to FIG. 2. FIGS. 4-1 through 4-5 each shows the powertrain system 5 of FIG. 1 with selected ones of the first, second and third clutches C1 32, C2 34, and C3 36 activated or deactivated, with activation indicated by broken line ovals.

FIG. 4-1 shows initial operation in Mode 4 (Load Share) with clutches C2 34 and clutch C3 36 activated. FIG. 4-2 shows operation in Mode 2 (2 motor EV) with clutch C2 34 activated after clutch C3 36 is deactivated. FIG. 4-3 shows operation in the Transition Mode with clutches C1 32 and C2 34 activated after clutch C1 32 has been activated. FIG. 4-4 shows operation in Mode 1 (1 motor EV) with clutch C1 32 activated after the clutch C2 34 is deactivated. FIG. 4-5 shows final operation in Mode 3 (Series) with clutches C1 32 and common clutch C3 36 activated, after common clutch C3 36 is activated to end the shift sequence.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Powertrain system, comprising:

an internal combustion engine and a transmission including first and second torque machines, a planetary gear set, and first, second, and third clutches, wherein the first clutch is configured to couple a first gear element of the planetary gear set to a transmission case ground when applied, the second clutch is configured to couple the first gear element of the planetary gear set to an output member of the first torque machine when applied, and the third clutch is configured to couple an input member of the first torque machine to an output member of the engine when applied; and a control module
configured to activate selected ones of the first, second, and third clutches to control operation of the powertrain system in one of a plurality of operating modes,
configured to sequentially deactivate the third clutch, activate one of the first and second clutches and deactivate the other of the first and second clutches, and activate the third clutch to effect a transition between a first one of the plurality of operating modes and a second one of the plurality of operating modes.

2. The powertrain system of claim 1 wherein the first clutch is the activated one of the first and second clutches and wherein the second clutch is the deactivate one of the first and second clutch.

3. The powertrain system of claim 2, wherein the first one of the plurality of operating modes comprises an engine-on load share operating mode and the second one of the plurality of operating modes comprises a series-hybrid operating mode.

4. The powertrain system of claim 1 wherein the second clutch is the activated one of the first and second clutches and wherein the first clutch is the deactivate one of the first and second clutch.

5. The powertrain system of claim 4, wherein the first one of the plurality of operating modes comprises a series-hybrid operating mode and the second one of the plurality of operating modes comprises an engine-on load share operating mode.

* * * * *